Figure 1:
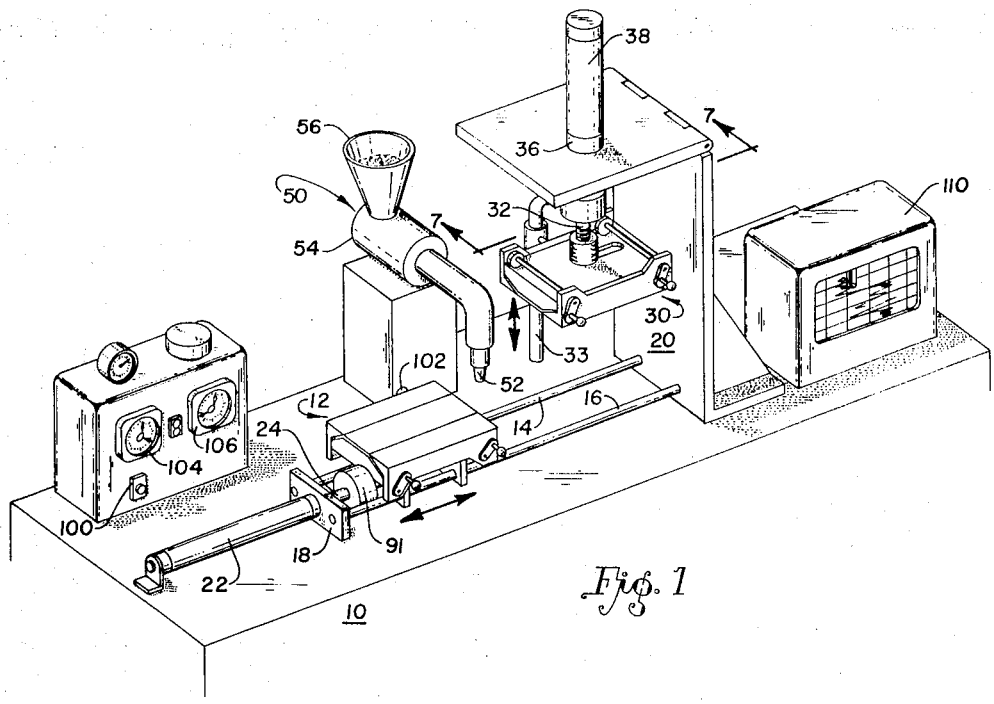
Figure 2:
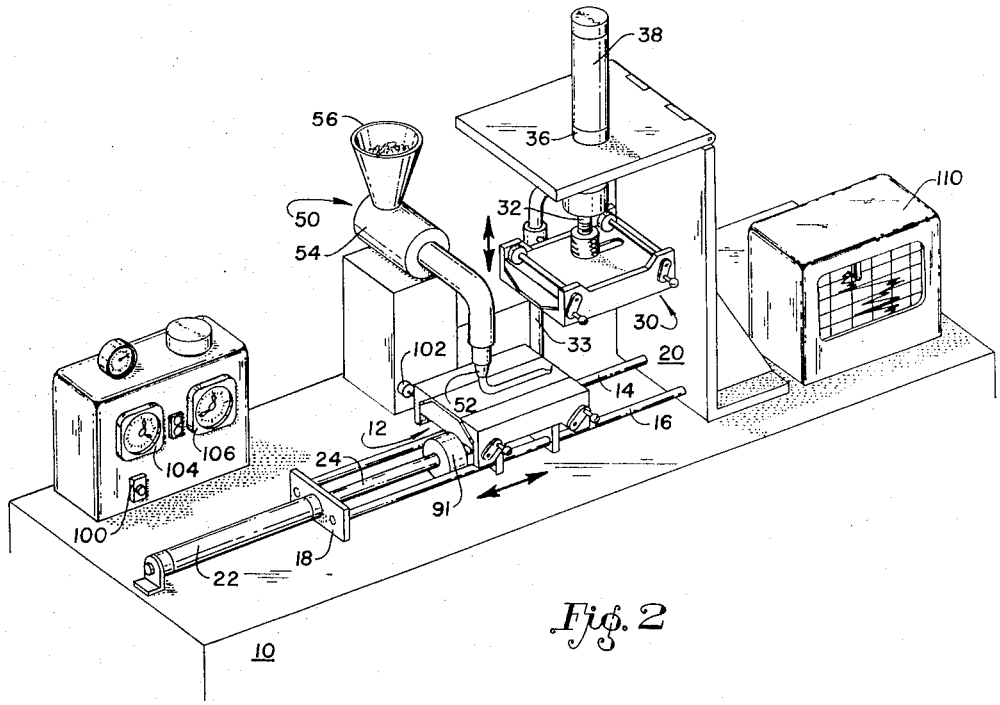
Figure 3:
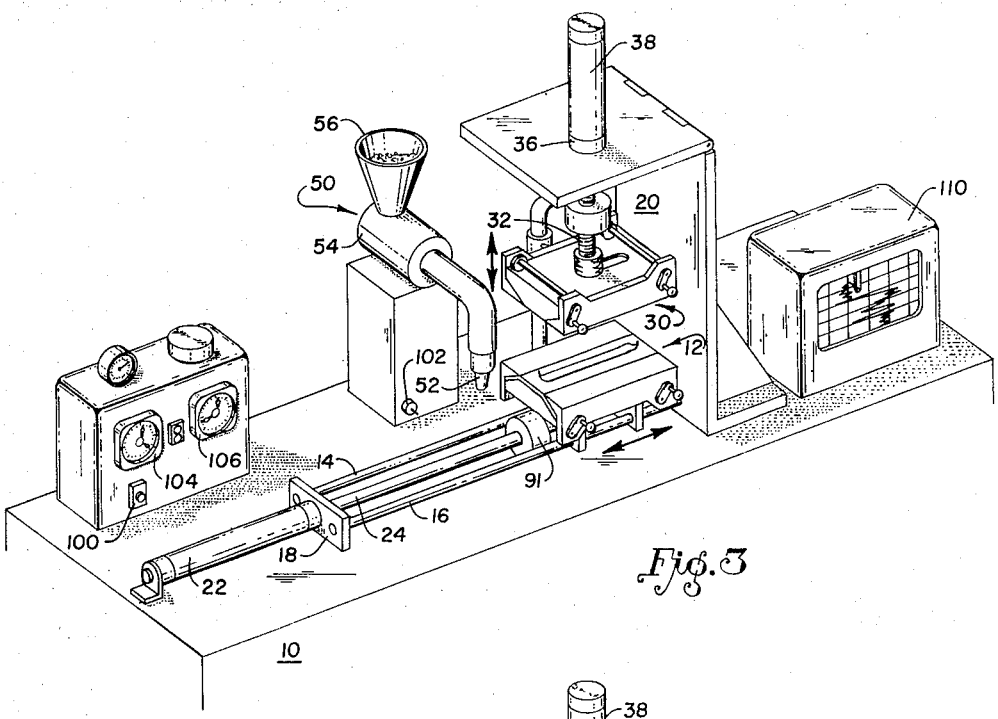
Figure 4:
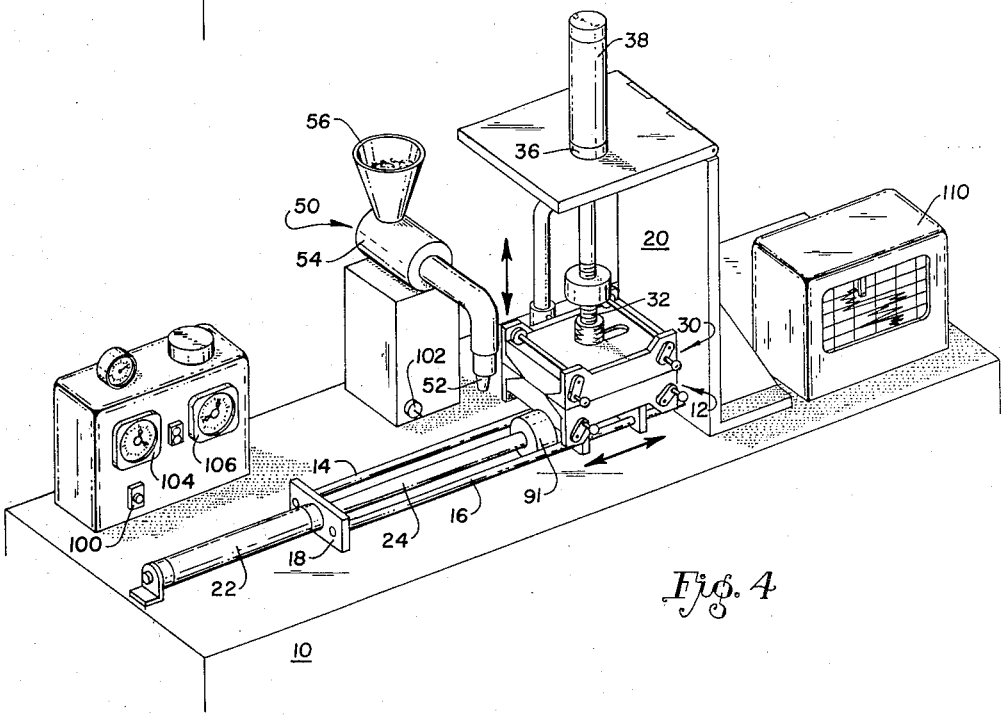
Figure 5:
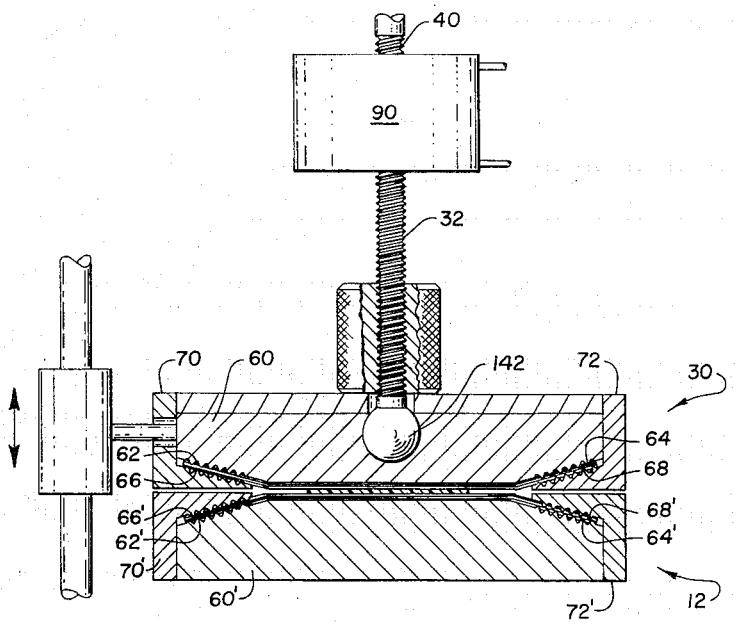
Figure 6:
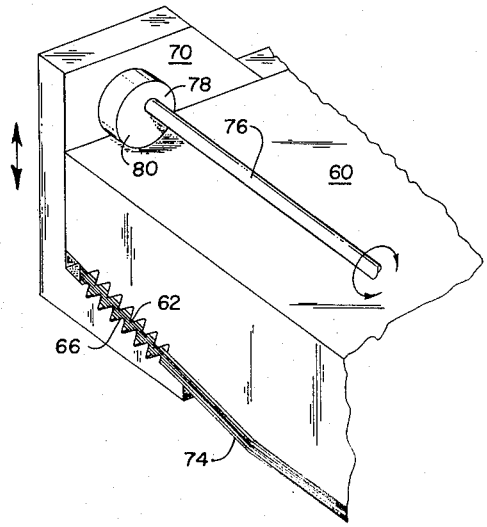
Figure 7:
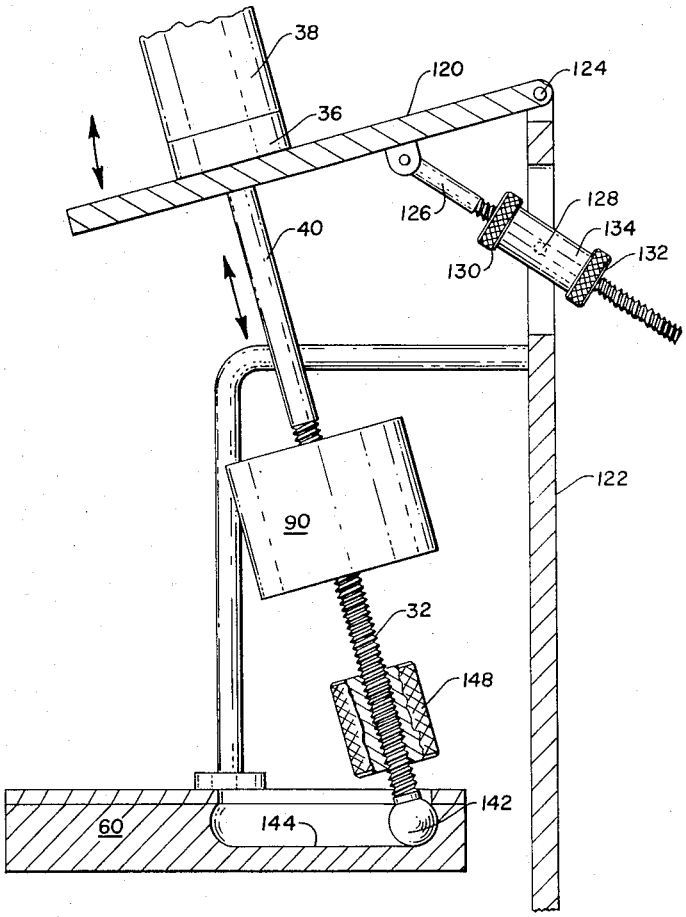

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 27, 1973

916. O.G. 1212

T916,005

ADHESIVE BOND TESTING APPARATUS

Cecil W. Dolen, Rte. 8, Rogersville, Tenn. 37857, and Robert M. Elliott, Rte. 4, Wines Circle, Blountville, Tenn. 37617

Filed Feb. 28, 1973, Ser. No. 336,580

Int. Cl. G01n *19/04*

U.S. Cl. 73—150 A

4 Sheets Drawing. 8 Pages Specification

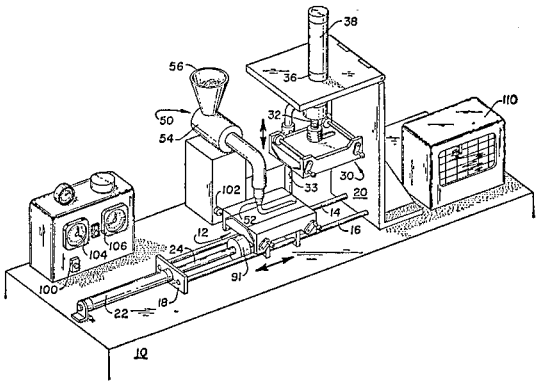

Apparatus is disclosed for determining physical properties such as bond strength, shear strength, peel strength, etc., of an adhesive bond between two substrates. The apparatus comprises a pair of cooperating carriages to which workpieces are secured and means for applying a controlled amount of adhesive to one of the substrates. The apparatus further includes apparatus for bringing the substrates together so they will contact in the area of the applied adhesive and holding in that position for a predetermined length of time while measuring the applied force maintaining the substrates together. Means are also provided for measuring the magnitude of force required to separate the substrates in any of several directions to measure, for example, bond strength, shear strength or peel strength. Load cells are convenient means for determining the separation force. The apparatus is especially adapted for use with hot melt adhesives.

ADHESIVE BOND TESTING APPARATUS

Filed Feb. 28, 1973 4 Sheets-Sheet 1

ADHESIVE BOND TESTING APPARATUS

Filed Feb. 28, 1973 4 Sheets-Sheet 2

ADHESIVE BOND TESTING APPARATUS

Filed Feb. 28, 1973 4 Sheets-Sheet 3

ADHESIVE BOND TESTING APPARATUS

Filed Feb. 28, 1973 4 Sheets-Sheet 4